United States Patent [19]

Matsuura

[11] Patent Number: 4,835,483
[45] Date of Patent: May 30, 1989

[54] QAM DEMODULATOR WITH RAPID RESYNCHRONIZATION FUNCTION

[75] Inventor: Toru Matsuura, Tokyo, Japan

[73] Assignee: NEC Corporation, Tokyo, Japan

[21] Appl. No.: 222,665

[22] Filed: Jul. 21, 1988

Related U.S. Application Data

[63] Continuation-in-part of Ser. No. 102,925, Sep. 30, 1987.

[30] Foreign Application Priority Data

Sep. 30, 1986 [JP] Japan .................... 61-233060

[51] Int. Cl.$^4$ .............................................. H03D 3/18
[52] U.S. Cl. ........................................ 329/50; 329/109; 329/124; 329/135; 375/80; 375/101
[58] Field of Search ................ 329/50, 109, 110, 122, 329/124, 135; 375/14, 15, 39, 78, 80, 101

[56] References Cited

U.S. PATENT DOCUMENTS

| | | | |
|---|---|---|---|
| 4,567,599 | 1/1986 | Mizoguchi | 333/18 X |
| 4,703,282 | 10/1987 | Yoshida | 329/50 |

*Primary Examiner*—David Mis
*Attorney, Agent, or Firm*—Sughrue, Mion, Zinn, Macpeak & Seas

[57] ABSTRACT

In order to rapidly resynchronize a QAM demodulator by effectively operating a transversal equalizer, when the demodulator remains in synchronism, a transversal filter forming part of the equalizer is allowed to operate normally. On the other hand, in the event that the demodulator falls into asynchronism, (a) the transversal filter intermittently operates and receives a first constant voltage during the discontinuous operations if a deviated message point is detected within a predetermined region and (b) the transversal filter is alternately supplied with the first constant voltage and a second constant voltage if a deviated message point is outside the predetermined of the region.

2 Claims, 17 Drawing Sheets

17~34 : ONE-BIT DELAY LINE

17~34: ONE-BIT DELAY LINE

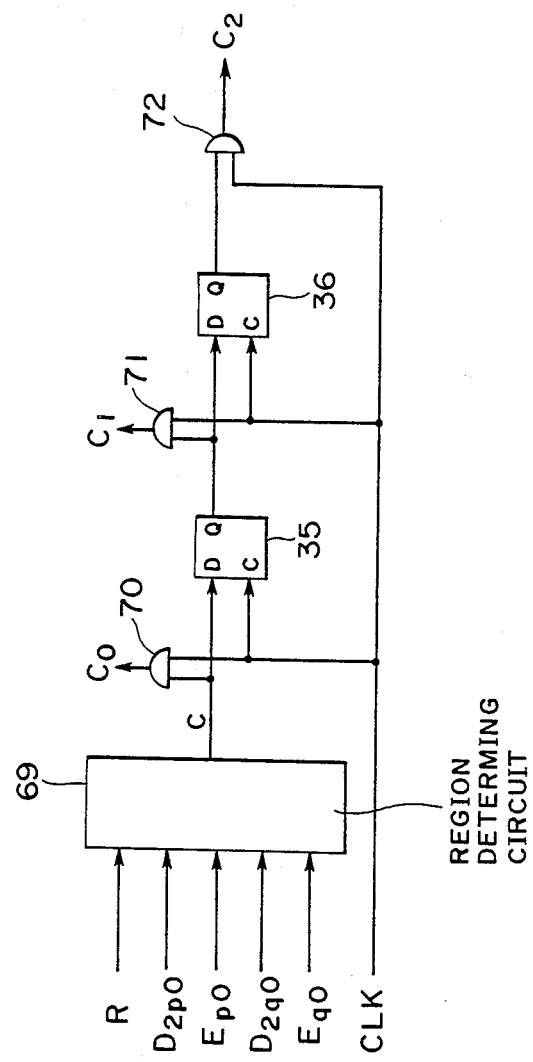

17~34
120~122  } ONE-BIT DELAY
129~131

4,835,483

QAM DEMODULATOR WITH RAPID RESYNCHRONIZATION FUNCTION

This is a continuation-in-part of application Ser. No. 102,925 filed Sept. 30, 1987.

BACKGROUND OF THE INVENTION

1. Field of the Invention

This invention relates generally to a QAM (Quadrature Amplitude Modulation) demodulator and more specifically to such a demodulator featuring an improved function by which resynchronization can be achieved in a shorter time duration as compared with known QAM demodulators. This invention is highly suited for use in a digital radio transmission system.

2. Description of the Prior Art

A digital radio transmission system is susceptible to multipath fading or the like and invites waveform distortion of the transmitted signal, which degrades signal reception. In order to minimize these problems, it is the current practice to employ a transversal equalizer using a transversal filter.

The transversal equalizer in a digital radio transmission system, however, has encountered the difficulty that distortion of the transmitted signal is apt to exceed the equalizing capability thereof. More specifically, upon the distortion reaching a level at which the equalizer is unable to deal with same, asynchronism of clock and carrier signal in a demodulator is induced and results in asynchronism of the control loop of the transversal filter. These conditions induce signal distortion within the equalizer itself. Therefore, even if the distortion of the transmitted signal again falls within the capability of the equalizer, the synchronized state is not automatically restored in the equalizer. A known approach to solving this problem is to reset the tap gain control signals to their initial values upon the occurrence of asynchronism in the demodulator. This prior art maintains the equalizer at reset until resynchronism of the clock and carrier in the demodulator occurs. Accordingly, as the equalizer remains inoperative during this time period, the control loop of the equalizer is not brought into synchronization unless the waveform distortion of the transmitted signal is lowered to a considerable extent.

The problem of the prior art will further be discussed with reference to FIGS. 1 through 3.

FIG. 1 is a block diagram showing a known 16-QAM demodulator, which generally comprises a transversal equalizer 1 and a demodulator or demodulating section 2 interconnected thereto. The transversal equalizer 1 includes a tap gain control signal generator 3, four adders 5 to 8, four subtracters 9 to 12, a switch 85 and a transversal filter 4. On the other hand, the demodulator 2 includes a coherent detector 13, two 3-bit type of AD (Analog-to-Digital) converters 14 and 15, and a carrier recovery circuit 16. The transversal filter 1 includes a delay circuit with 5 taps and a tap gain controller (both not shown). The transversal filter 1 receives an incoming quadrature-modulated IF (Intermediate Frequency) signal, and reduces or eliminates intersymbol interference involved in the applied signal using tap gain control signals $R+1$, $R-1$, $R+2$, $R-2$, $I+1$, $I-1$, $I+2$ and $I-2$. These tap gain control signals are applied to the transversal filter 1 through the switch 85 from the adders 5–8 and subtracters 9–12.

The coherent detector 13 receives the output of the transversal filter 1 and coherently or synchronously demodulates same using a recovered carrier applied thereto from the carrier recovery circuit 16. The reproduced baseband signals (analog) P and Q are applied to the AD converters 14 and 15. The AD converter 14 outputs two data signals D1p, D2p, and an error signal Ep, while the other AD converter 14 outputs two data signals D1q, D2q, an error signal Eq, and a clock signal CLK. The carrier recovery circuit 16 is supplied with D1p, D1q, Ep, Eq, and recovers the carrier which is applied to the coherent detector 13 as above mentioned. On the other hand, the tap gain control signal generator 3 receives all of the outputs of the AD converters 14 and 15, and produces control signals $Rp+1$, $Rp-1$, $Rp+2$, $Rp-2$, $Rq+1$, $Rq-1$, $Rq+2$, $Rq-2$, $Ip+1$, $Ip-1$, $Ip+2$, $Ip-2$, $Iq+1$, $Iq-1$, $Iq+2$ and $Iq-2$, which undergo addition and subtraction at the next stage and then are applied, as the tap gain control signals $R+1$ through $I+2$, to the transversal filter 1 via the switch 85.

The carrier recovery circuit 16 produces a reset signal R which assumes a logic 0 as long as the demodulator 2 is synchronized and which assumes a logic 1 upon the demodulator 2 going out of synchronism. The switch 85 is reset in response to the reset signal R assuming a logic 1. More specifically, the switch 85 prohibits the tap gain control signals $R+1$ through $I-2$ to be applied to the transversal filter 1, and begins applying a previously determined constant levels to the transversal filter 1. This means that the transversal equalizer 1 is maintained inoperative while the reset signal R assumes a logic 1.

The principle operation of a transversal equalizer has been described in an article entitled "4/5 GHz 16-QAM 200 mb/s demodulator with transversal equalizer" in the 1984 plenary meeting of The Institute of Electronics Communications Engineers of Japan. Further, the carrier recovery circuit has been disclosed in detail in Japanese Patent Application No. 56-15775.

FIGS. 2A and 2B are block diagrams showing in detail the arrangement of the conventional tap gain control signal generator 3. As shown in FIG. 2A, tapped delay means 17L, 20L, 23L, 26L, 29L and 32L are provided in parallel, each of which includes three one-bit delay lines (17–34). The one-bit delay lines 17, 20, 26 and 29 respectively receives the data signals D1p, D2p, D1q and D2q, while the other one-bit delay lines 23 and 32 receives respectively the error signals Ep and Eq. Each of the delay means 17L, 20L, 23L, 26L, 29L and 32L outputs delayed signals (D1p0, D1p1, D1p2, etc., as shown in the drawing), some of which are applied to exclusive OR gates 37–52 of FIG. 2B and are utilized to generate the above-mentioned tap gain control signals $Rp+1$ through $Ip-2$. The operations of the arrangements shown in FIGS. 2A and 2B will be well known to those skilled in the art, so that the further description thereof will be omitted for clarity.

In order to explain in more detail the problem of the prior art, reference is now made to FIG. 3 in which a space diagram of the incoming modulated IF signal is illustrated concurrently with the outputs of the AD converters 14 and 15. In FIG. 3, 16 black circles are arranged in parallel with the orthogonal axes P and Q, and represent respectively normal or standard positions of the incoming message points A1 to A16. It is assumed that the message points A1, A5 and A13 respectively depart from their normal positions to A1', A5' and A13' due to intersymbol interference (viz., the standard message points are deviated in-phase with same polarity). In accordance with this assumption if the demodulator 2 is in synchronism, the deviated message points A1', A5' and A13' remains at their positions, and hence appropriate error signals are generated by which the undesirably deviated message points are able to be restored to their standard positions. On the other hand, if the demodulator 2 is not synchronized, the deviated message point A5' moves along circle M1 and is located at a message point A5" (for example). As a result, this message point A5" is erroneously determined as a message point which is deviated from the nearest message point A1. For this reason the transversal equalizer 1 is reset or rendered inoperative if the demodulator 2 is not synchronized. This control pause of the equalizer continues until the demodulator 2 restores synchronism.

In order to overcome this problem, intermittent resetting of a transversal filter has been proposed in the U.S. Pat. No. 4,567,599 assigned to the same entity as the instant invention. According to this prior art, when asynchronism is detected in a demodulator, a reset signal is intermittently generated to render the transversal filter operative at intervals during a period in which the transversal filter is paused.

The intermittent resetting as above mentioned will further be discussed with reference to FIG. 4, which shows in a block diagram form an arrangement of the carrier recovery circuit 16. The circuit 16 includes a voltage controlled oscillator (VCO) 100, a carrier recovery controller 102, a sine wave generator 104, an adder 106 and a reset signal generator 108. The generator 108 corresponds to an async detector 58 in FIG. 1 of the aforesaid U.S. Pat. No. 4,567,599, and includes four resistors R1, R2, R3 and R4, a capacitor C, a bias voltage source 110 and a comparator 112. The carrier recovery controller 102 receives the data and error signals D1p, D1q, Ep and Eq from the AD converters 14 and 15, and, upon detecting asynchronism in the demodulator 2, forces the sine wave generator 104 to generate a sine wave therefrom by applying an output signal 102a as a trigger signal. The frequency of the sine wave thus obtained should be very low (viz., about few Hz) in order to inspect a frequency for bringing the demodulator into synchronism. The VCO 100 receives the sum of the outputs of the carrier recovery controller 102 and the sine wave generator 104, and slowly changes the output, viz., the recovered carrier's frequency. The output of the VCO 100 is applied to the coherent detector 13. The operation of the closed control loop including the elements 100, 102, 104 and 106 is well known in the art, and hence further description thereof will be omitted for clarity.

On the other hand, according to the prior art such as the aforesaid U.S. Pat. No. 4,567,599, the sine wave generated at the generator 104 is also applied to the reset signal generator 108 and is integrated at an integrator consisting of the resistor R1 and the capacitor C. It should be noted that the time constant of the integrator should be considerably large (viz., few hundreds ms) in order to integrate the sine wave with such a long period. The comparator 112 outputs a logic 0 when the voltage at its inverting input(−) exceeds the voltage applied to its non-inverting input (+). The output of the comparator 112 (logic 1 or 0), viz., the reset signal R, is applied to the switch 85, which corresponds to a reset controller 60 in FIG. 1 of the U.S. Pat. No. 4,567,599. The switch 85 (or the reset controller 60), upon receiving a logic 0 from the carrier recovery circuit 16, initiates intermittent resetting of the transversal filter 4 until a logic 1 is applied to the switch 85 from the reset signal generator 108.

As previously mentioned, the time constant of the integrator (R1 and C) is very large as compared with the carrier frequency. Hence, even if the demodulator 13 is again brought into synchronism by the intermittent resetting, the output of the generator 108 does not change rapidly from a logic 0 to a logic 1 in response to the resynchronism. This means that the known technique has encountered the problem that the demodulator 13 once resynchronized by the intermittent resetting is apt to again fall into asynchronism due to signal distortion which occurs until the reset signal generator 108 outputs a logic 1 in response to the resynchronism. Summing up, this prior art strives to shorten the inoperative duration of the equalizer by discontinuously checking quality recovery of an incoming IF signal through intermittent resetting of the equalizer. However, such an approach fails to solve the drawback arising from the fact that the reset signal generator 108 is slow in response upon the demodulator restoring synchronism, and has proven insufficient to effectively shorten the inoperative period of the equalizer.

The U.S. Pat. No. 4,703,282 assigned to the same entity as the instant invention discloses an improved digital demodulator, wherein a message point of an incoming quadrature-modulated signal is checked as to its location within a signal space diagram. However, this prior does not employ intermittent resetting of a transversal filter while a demodulator is in asynchronism, and hence resynchronization can not be attained in a short time duration as compared with the instant invention.

SUMMARY OF THE INVENTION

It is an object of this invention to provide a QAM demodulator equipped with a transversal equalizer, which feature an improved function by which resynchronization can be achieved in a shorter time duration.

In general terms the present invention provides a QAM demodulator whose normal operation can rapidly be restored by effectively operating a transversal equalizer comprising a transversal filter. According to the present invention, in the event that the demodulator remains in synchronism, the transversal filter is allowed to operate normally. On the other hand, in the event that the demodulator falls into asynchronism, (a) the transversal filter intermittently operates and receives a first constant voltage during the intermittent operations if a deviated message point is detected within a predetermined region and (b) the equalizer is alternately supplied with the first constant voltage and a second constant voltage.

More specifically, the present invention takes the form of a QAM demodulator including a transversal equalizer and a demodulating section, the transversal equalizer including a transversal filter, the transversal filter compensating for intersymbol interference involved in an incoming quadrature-amplitude modulated signal applied thereto, the demodulating section receiving the output of the transversal filter and producing data and error signals, the demodulating section including a sine wave generator which produces a sine wave in response to asynchronism induced in the demodulating section, the demodulating section comprises: first means coupled to the sine wave generator, the first means producing a first logic signal indicating whether or not the demodulator is in synchronism; second means coupled to the sine wave generator, the second means producing a second logic signal according to the sine wave applied thereto, the period of the second logic signal being equal to the period of the sine wave and the duty cycle of the second logic signal being adjustable; and, the transversal equalizer comprising: switch means having its output coupled to the transversal filter and having a first input coupled to the second means, the switch means intermittently applying a first constant voltage to the transversal filter in response to the second logic signal; third means receiving the data and error signals and the first logic signal, and determining whether or not a message point of the incoming signal is deviated from the normal position thereof into a predetermined region of a signal space diagram, the third means outputting a third logic signal indicating whether or not the message point is deviated into the predetermined region; and fourth means coupled to a second input of the switch means, the fourth means responding to the first and third logic signals and controlling the operation of the transversal filter together with the switch means such that, (a) in the event that the demodulating section is in synchronism, the transversal equalizer is allowed to operate normally, (b) in the event that the demodulating section falls into asynchronism, if a deviated message point is detected within the predetermined region, the transversal filter intermittently operates and receives the first constant voltage between the intermittent operations, and (c) in the event that the demodulating section falls into asynchronism, if a deviated message point is outside the predetermined region, the transversal filter receives alternately the first constant voltage and a second constant voltage from the fourth means.

BRIEF DESCRIPTION OF THE DRAWINGS

The features and advantages of the present invention will become more clearly appreciated from the following description taken in conjunction with the accompanying drawings in which like blocks or signals are denoted by like reference numerals and in which:

FIGS. 6A, 6B, 6C and 7 are block diagrams illustrating in detail a block of the FIG. 4 arrangement;

DETAILED DESCRIPTION OF THE PREFERRED EMBODIMENTS

Figure 1:
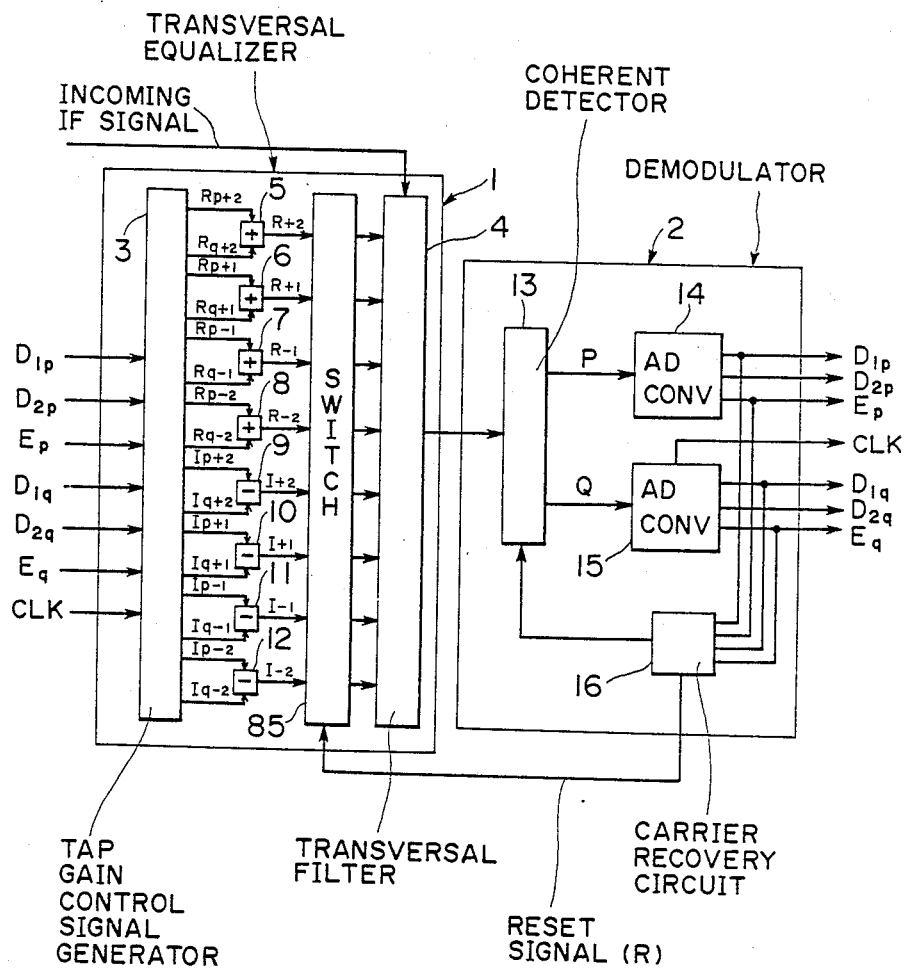
FIG. 1 is a block diagram showing a conventional 16-QAM demodulator.
Figure 5:
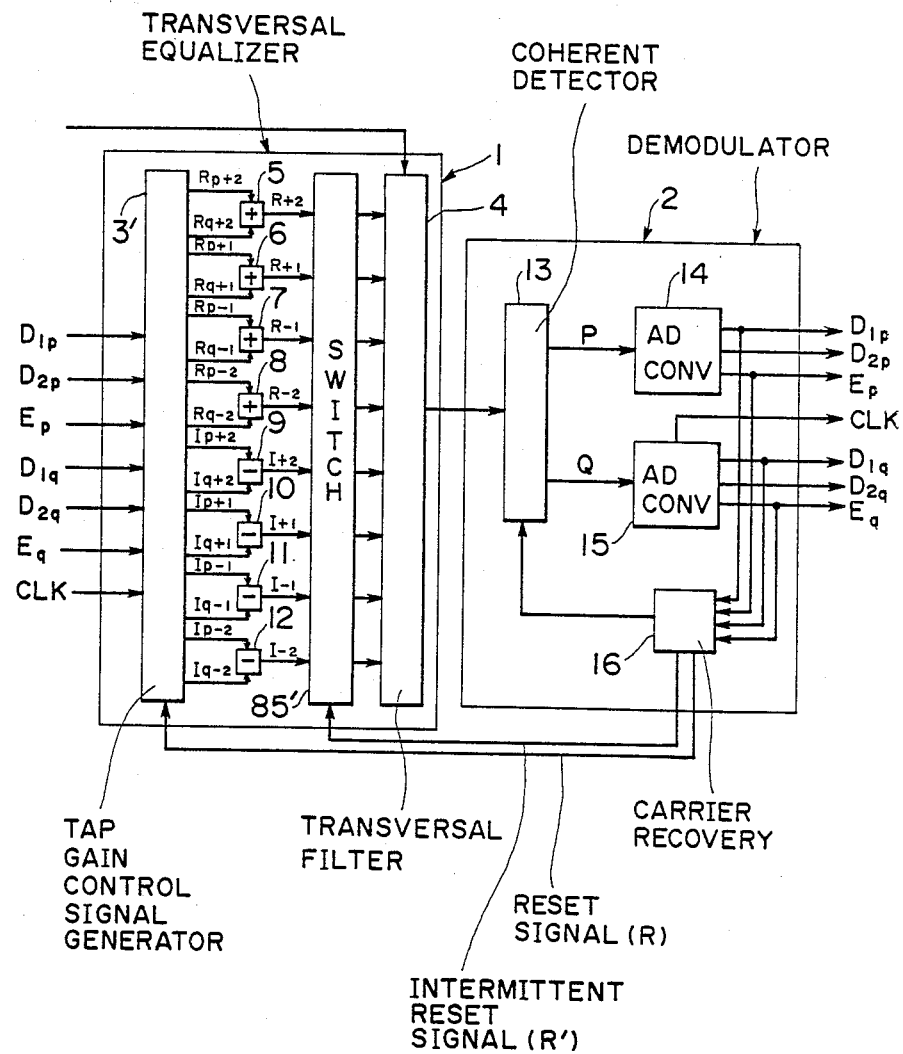
FIG. 5 is a block diagram showing a 16-QAM demodulator according to this invention.

Reference is now made to FIG. 5, wherein a first embodiment of this invention is shown in block diagram form. The system shown in FIG. 5 is a 16-QAM demodulator and is identical to that shown in FIG. 1 except that (a) a tap gain control signal generator 3' and a switch 85' of FIG. 5 are respectively configured somewhat differently as compared with their counterparts 3 and 85, (b) the reset signal R is applied to the generator 3' and (c) an intermittent reset signal R' is applied to the switch 85'. The above-mentioned differences will be described later in detail, but the remaining portions of FIG. 5 will not be described since already referred to with reference to the known techniques set forth in the opening paragraphs.

The details of the tap gain control signal generator 3' are illustrated in FIGS. 6A, 6B, 6C and FIG. 7.

Figure 2A:
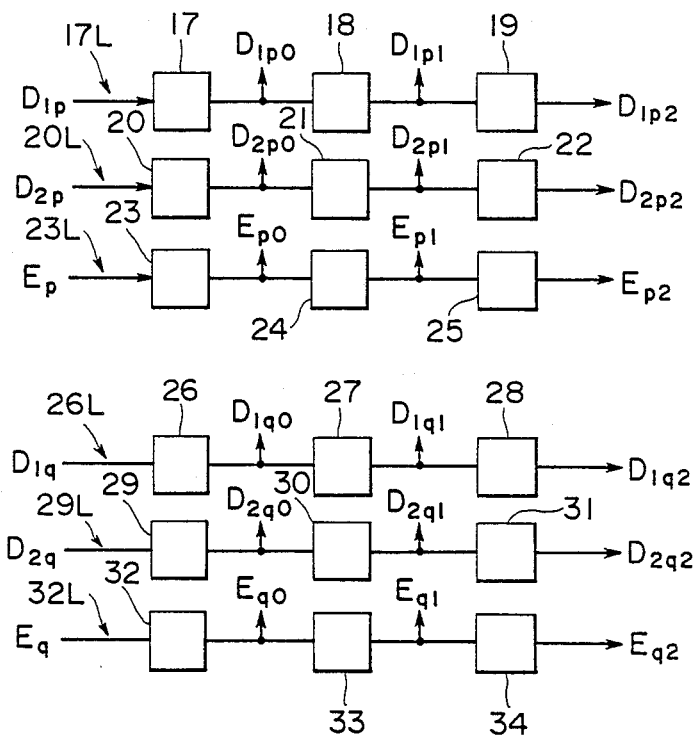
FIGS. 2A and 2B are block diagrams illustrating one example of a portion of the FIG. 1 arrangement.
Figure 2B:
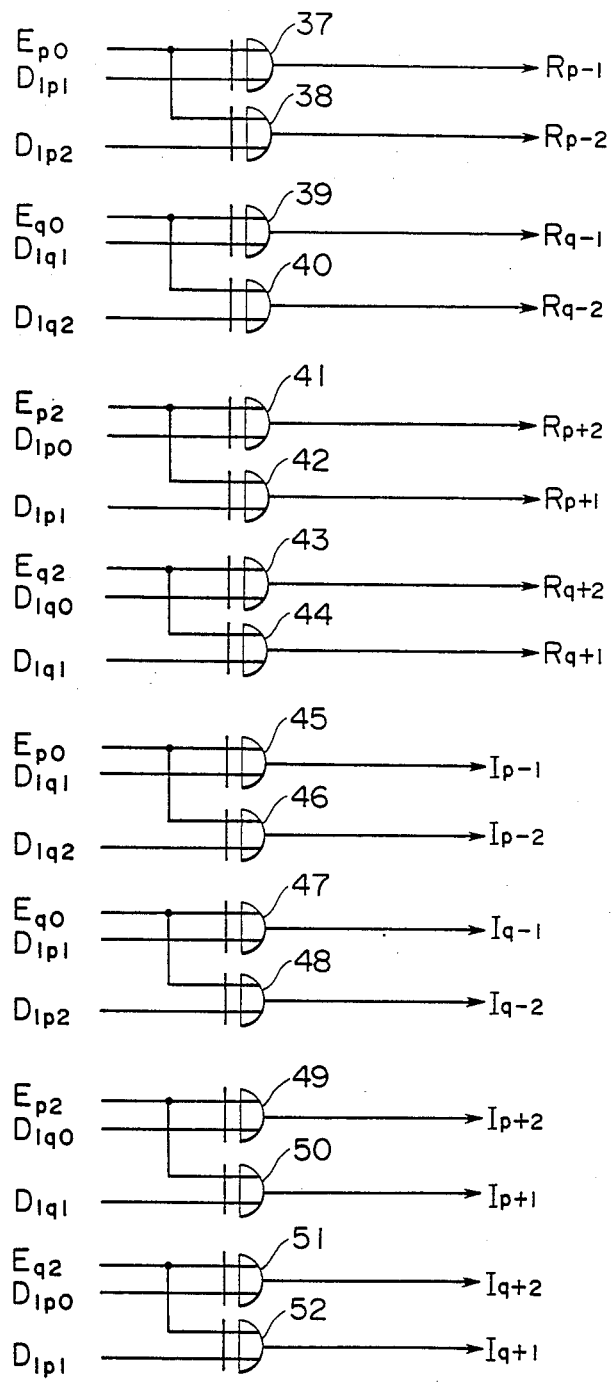
Figure 6A:
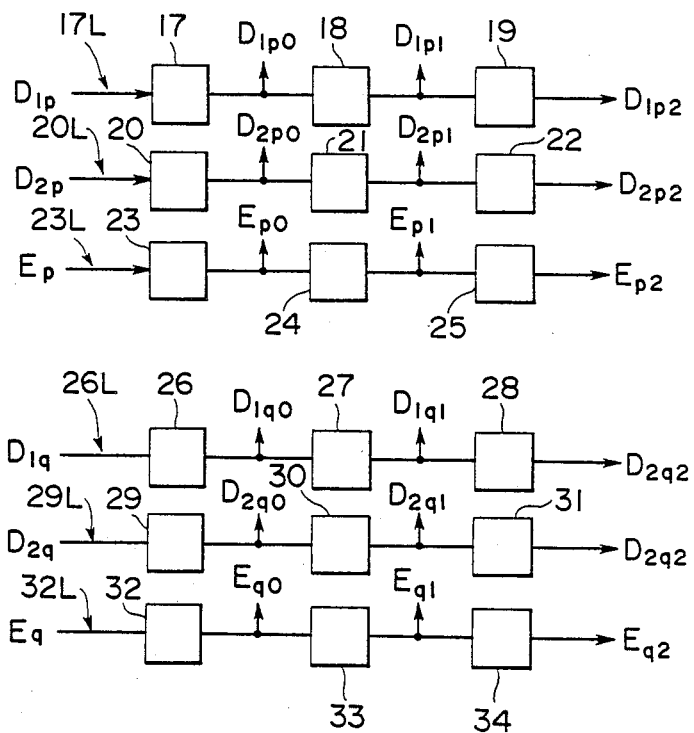
Figure 6C:
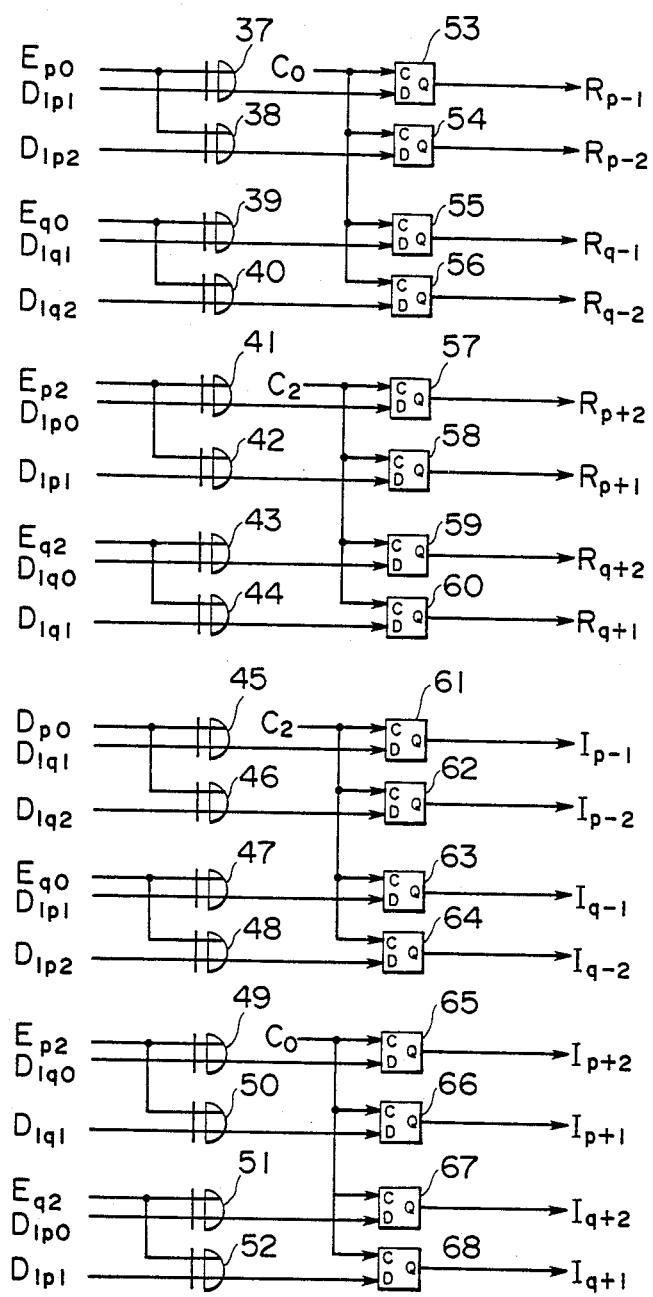

FIG. 6A is identical to FIG. 2A but presented again only for the convenience of explaining the first embodiment. FIG. 6B is a block diagram showing circuitry coupled to the FIG. 6A arrangement. FIG. 6C is a block diagram showing circuitry which is coupled to the FIGS. 6A and 6B arrangements and which generates the control signals $Rp+1$ through $Iq-2$. The FIG. 6B arrangement comprises a region determining circuit 69, three AND gates 70, 71 and 72, and two D flip-flops 35, 36. The region determining circuit 69 has inputs coupled to the delay means 20L, 23L, 29L and 32L of FIG. 6A and coupled to the carrier recovery circuit 16, and is supplied with the signals $D2p0$, $Ep0$, $D2q0$, $Eq0$ and the reset signal R. The region determining circuit 69 produces an output C, while the OR gates 70, 71 and 72 produce outputs C0, C1 and C2, respectively. The circuit 69 will be explained in detail with reference to FIG. 7, which shows the detailed arrangement of the circuit 69 and which comprises three inverters 73, 74 and 75, two exclusive OR gates 76, 77, and two OR gates 78, 79. The arrangement shown in FIG. 6C is identical to that of FIG. 2B except that the former arrangement further includes D flip-flops 53 to 68, whose data inputs D are respectively coupled to the outputs of the exclusive OR gates 37 to 52 and whose clock inputs receive the control signals C0, C2 from the circuit shown in FIG. 6B.

Figure 4:
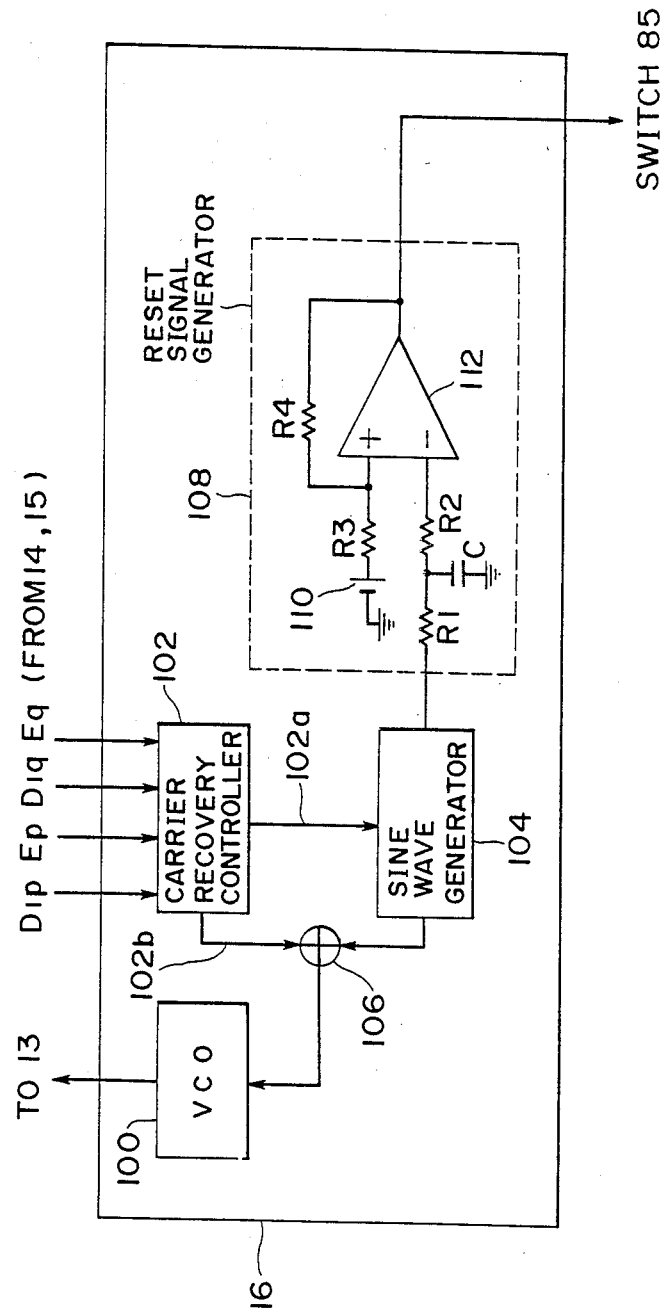
FIG. 4 is a block diagram showing an arrangement of a conventional carrier recovery circuit forming part of the FIG. 1 arrangement.
Figure 8:
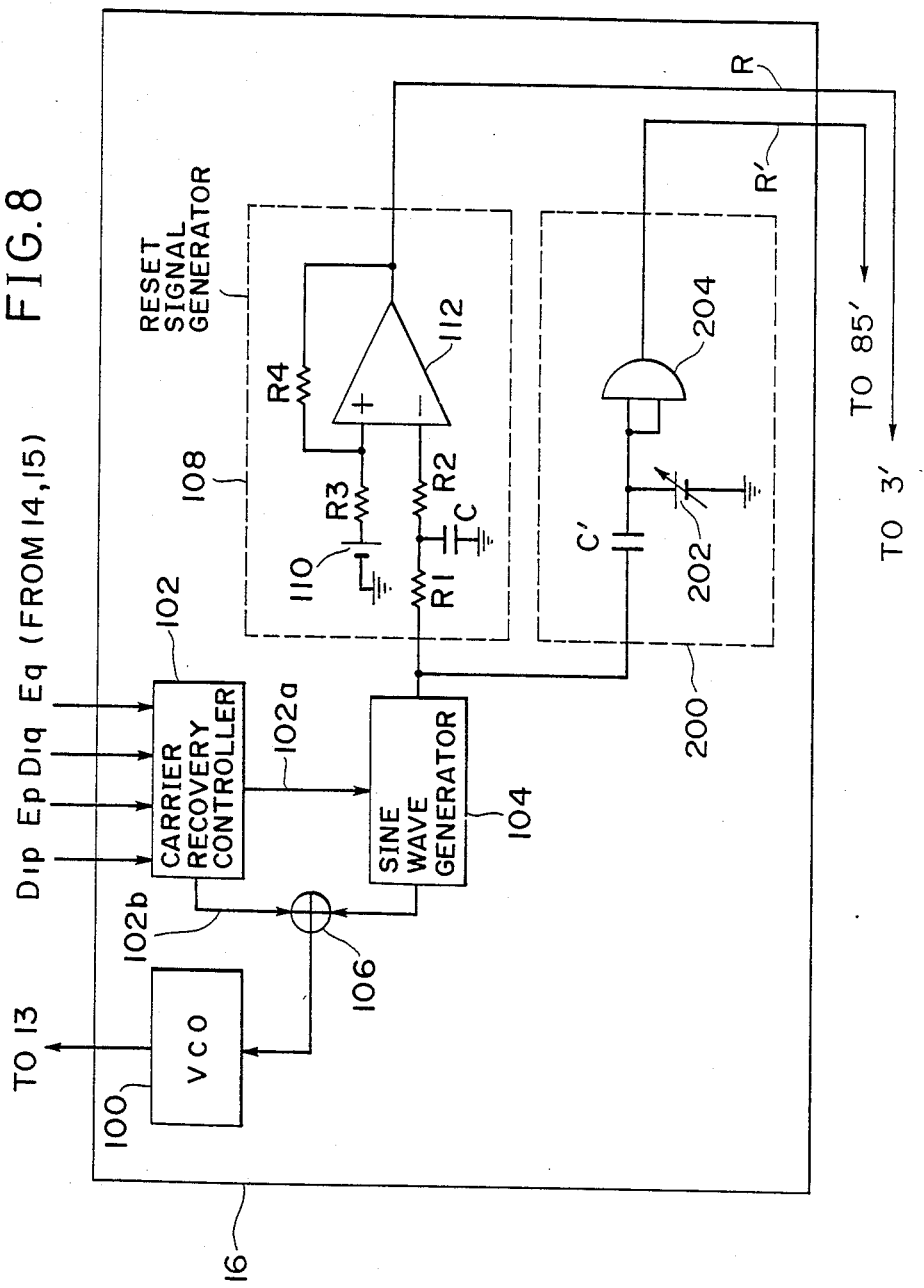
FIG. 8 is a block diagram form showing an arrangement of a carrier recovery circuit forming part of the FIG. 5 arrangement.

FIG. 8 is a block diagram showing in detail an arrangement of the carrier recovery circuit 16 of FIG. 5. The arrangement shown in FIG. 8 is equal to that shown in FIG. 4 except that the former arrangement further includes a logic circuit 200 which comprises a capacitor C', an adjustable bias voltage source 202 and an adder 204 and which produces an intermittent reset signal R'.

Figure 9:
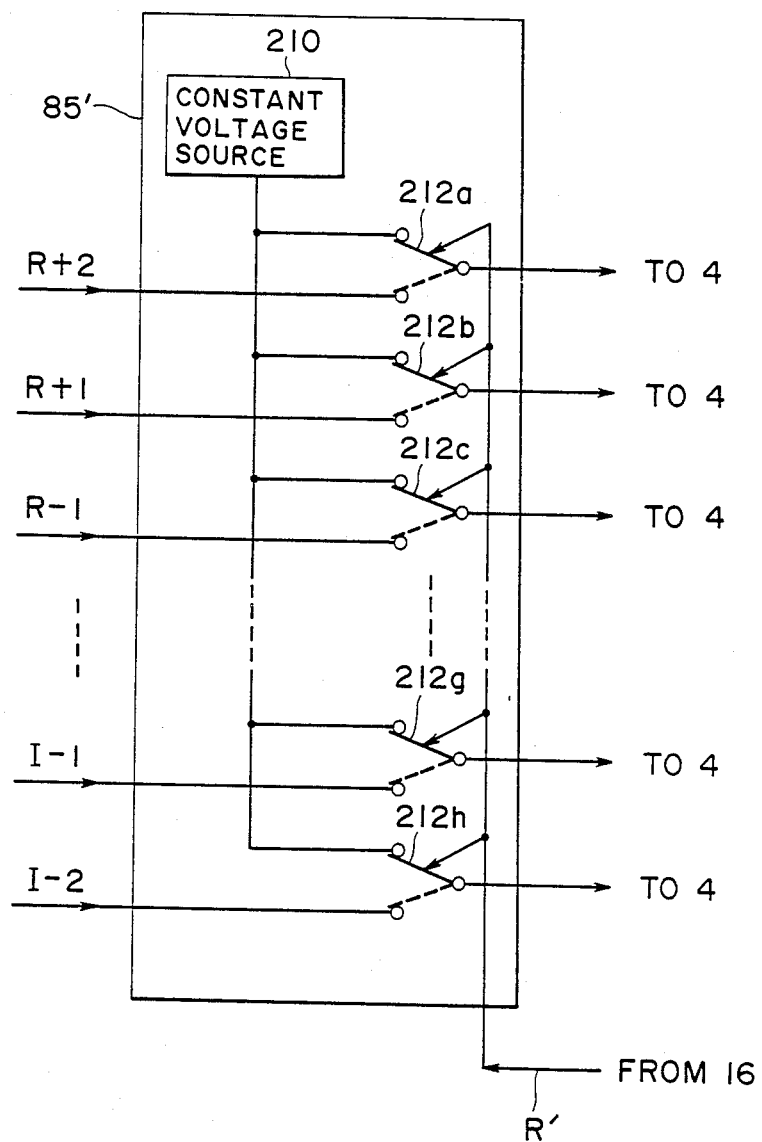
FIG. 9 is a block diagram showing an arrangement of a switch forming part of the FIG. 5 arrangement.

FIG. 9 is a block diagram showing an arrangement of the switch 85' which comprises a constant voltage source 210 and eight switches 212a through 212h although only five thereof are shown.

Figure 3:
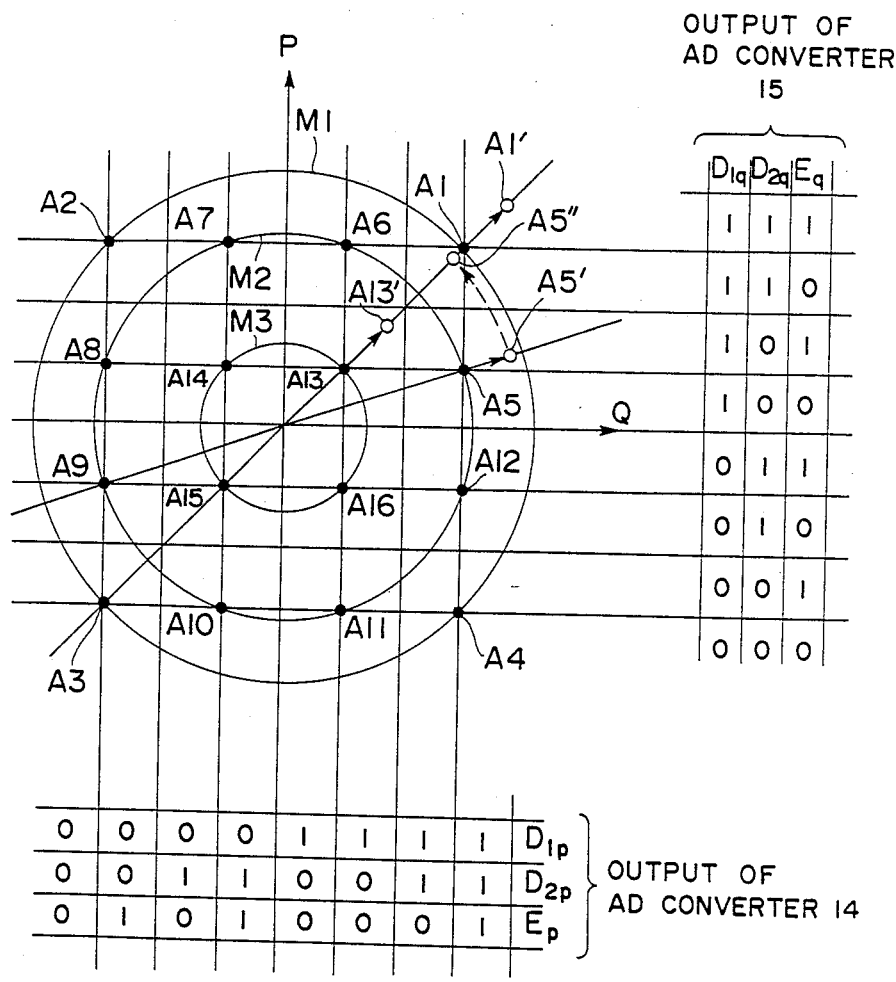
FIG. 3 is a signal space diagram of an incoming quadrature-modulated signal and also shows tables of the outputs of some blocks included in the FIG. 1 arrangement.
Figure 10:
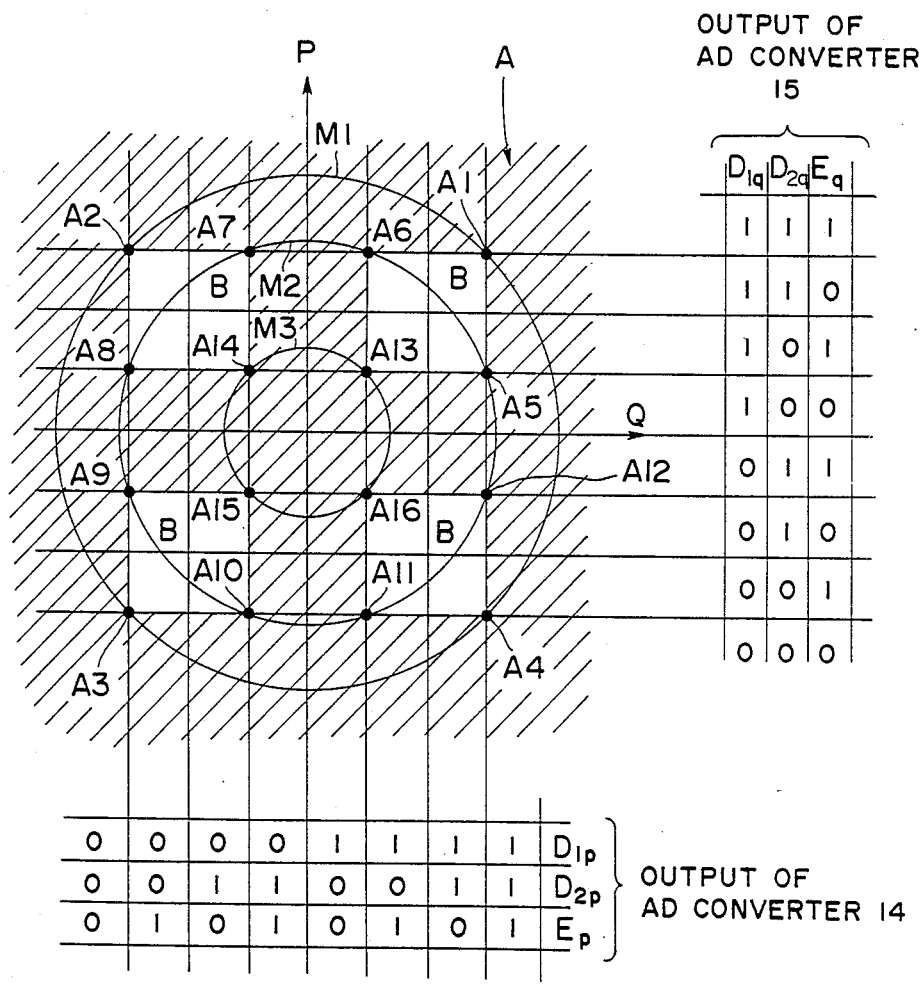
FIG. 10 is a signal space diagram of an incoming quadrature-modulated signal and also shows tables of the outputs of some blocks included in the FIG. 5 arrangement.

FIG. 10 is a space diagram showing the 16 normal positions of the incoming IF message points A1 to A16, which corresponds to those shown in FIG. 3. In FIG. 10, the hatched portion (region A) is defined as a controllable region, while the non-hatched portions (regions B) are defined as uncontrollable regions. More specifically, any signal deviated into the region A is apt to restore its normal position with high probability as compared with the case where a deviated signal is located within the region B. Such a probability increases in the case of a multivalue QAM demodulator more than 16 (such as 64- and 256-QAM demodulators).

According to the present invention, in the event that the demodulator 2 remains in synchronism, the transversal filter 4 is allowed to operate normally. On the other hand, in the event that the demodulator 2 falls into asynchronism, (a) the transversal filter 4 functions intermittently if a deviated message point is detected within the region A and (b) the transversal filter 4 is alternately supplied with the output of the tap gain controller 3 and a constant voltage if a deviated message point is outside the region A (viz., within the region B). In other words, the equalizer 1 is rendered inoperative only if the demodulator 2 is not synchronized and concurrently if a deviated signal is within the B region.

The operation of the first embodiment of this invention shown in FIG. 5 will be described with reference to FIGS. 6A-6C and 7-10.

The carrier recovery controller 102 (FIG. 8), upon detecting asynchronism in the demodulator 2, forces the sine wave generator 104 to produce a sine wave as previously mentioned. The logic circuit 200 receives the sine wave and generates a binary logic signal alternately assuming logic 1 and 0. The period of this logic signal is equal to that of the sine wave and the duty cycle thereof is controlled by the adjustable power source 202. The output of the logic circuit 200 is applied to the switch 3′ as the intermittent reset signal R′. The AND gate 204 can be replaced with other suitable element such as an OR gate. The switch 3′, in response to the intermittent reset signal R′, alternately applies the constant voltage from the source 210 and the output of the tap gain control signal generator 3 to the filter 4. It should be noted that the intermittent reset signal R′ is generated when the demodulator 2 falls into asynchronism.

The AD converters 14, 15 (FIG. 5) apply the signals D1p, D2p, Ep, D1q, D2q and Eq to the delay means 17L, 20L, 23L, 26L, 29L and 32L (FIG. 6A), respectively. The region determining circuit 69 receives the delayed outputs D2p0, Ep0, D2q0 and Eq0 from the delay means 20L, 23L, 29L and 32L, respectively, and also receives the reset signal R from the carrier recovery circuit 16. Further, the various delayed outputs obtained at the delay means in FIG. 6A, are applied to the exclusive OR gates 37 to 52 of FIG. 6C in the same manner as in FIGS. 2A and 2B. The outputs of the exclusive OR gates 37 to 52 of FIG. 6C are respectively applied to the data inputs D of the corresponding D flip-flops 53-68. The flip-flops 53-68 of FIG. 6C apply the control signals $Rp+1$ through $Iq-2$ to the adders 5-8 and the subtracters 9-12 (FIG. 5). It should be noted that it depends on the clock signals C0, C2 if the control signals $Rp+1$ through $Iq-2$ have been renewed or not.

Figure 7:
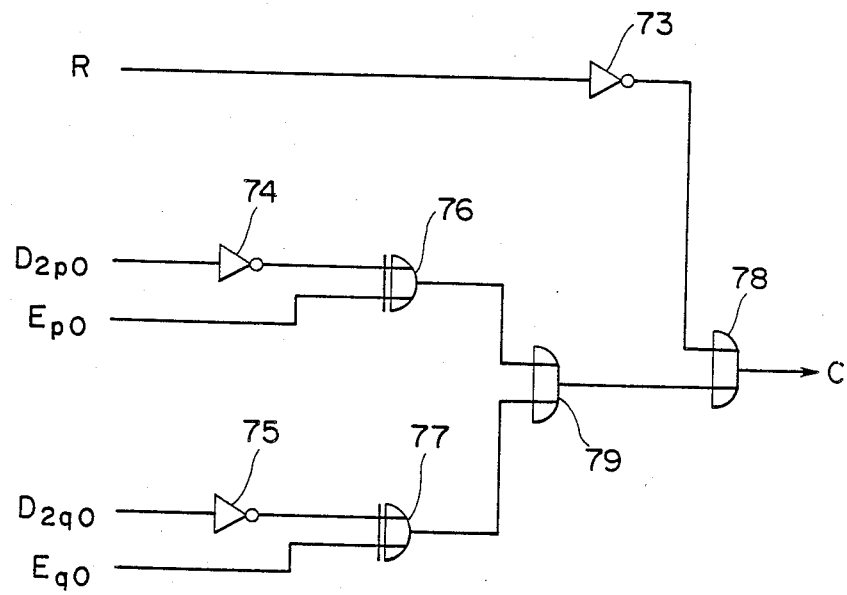

In FIG. 7, the OR gate 79 outputs a logic 1, if the signals D2p0 and Ep0 assume the same logic state or if the signals D2q0 and Eq0 assume the same logic sate. In other words, if a deviated message point is located within the controllable region A (FIG. 10), the OR gate 79 outputs a logic 1. The elements 74, 75, 76, 77 and 79 serve to determine whether or not a deviated signal point is within the region A. Therefore, if a deviated message point is located within the region A, the output C of the OR gate 78 assumes a logic 1 regardless of whether or not the demodulator 2 is synchronized. The output C (a logic 1) causes the outputs C0, C1 and C2 of the AND gates 70, 71 and 72 (FIG. 6B) to assume a logic 1 in synchornism with the clock CLK. (It should be noted that the output C1 is not applied to the D flip-flops shown in FIG. 5C in this embodiment.) Therefore, the D flip-flops 53 to 68 respond to the outputs C0 and C2 and relay the outputs of the corresponding exclusive OR gates 37-52 to the adders 5-8 and the subtracters 9-12, whereby the equalizer 1 functions normally or intermittently depending upon synchronism and asynchronism of the demodultor 2.

In the event that a deviated message point resides within the uncontrollable region B, none of the exclusive OR gates 76, 77 assumes a logic 1. In this case, if the demodulator 2 stays in synchronism (viz, if the reset signal assumes a logic 0), the output of the OR gate 78 takes a logic 1 and hence the equalizer 1 is allowed to normally perform its function. Also in the event that a deviated message point is within the region B, if the demodulator 2 is in asynchronism, the output of the OR gate 78 assumes a logic 0. As a result, each D flip-flop of FIG. 6C holds its output and continues outputting same (viz., outputting a constant voltage). However, since the demodulator 2 is in asynchronism in the second case, the transversal filter 4 is intermittently controlled by the tap control signals which are stored in the D flip-flops 53-68 just before the filter control becomes impossible while been intermittently supplied with the constant voltage from the voltage source 210.

As above mentioned, when the demodulator 2 falls in asynchronism, the transversal filter 4 is intermittently supplied with the control signal which is considered as the most appropriate control signal while the transversal filter 4 is rendered inoperative and also is intermittently supplied with the constant voltage from the source 210. Especially, applying discontinuously the constant voltage to the filter 4 during asynchronism in the demodulator 2, is able to achieve resynchronization of the equalizer 1 in a shorter time duration. The value of the constant voltage and the duty cycle of the intermittent reset signal R′ are determined considering practical circuit parameters.

Reference is now made to FIGS. 11 through 14, wherein a second embodiment according to this invention is illustrated. FIGS. 11, 12, 13 and 14 correspond to FIGS. 6A, 6B, 7 and 10, respectively, and FIGS. 5 and 6C of the first embodiment are used in the second embodiment without being unchanged or slightly modified. As clearly seen from FIG. 14, this embodiment is directed to a 64-QAM demodulator and the underlying principle thereof is essentially equal to that of the first embodiment. As previously mentioned, this invention is more useful when applied to higher multilevel QAM type demodulators than the lower multilevel type (such as 16-QAM demodulators).

Figure 11:
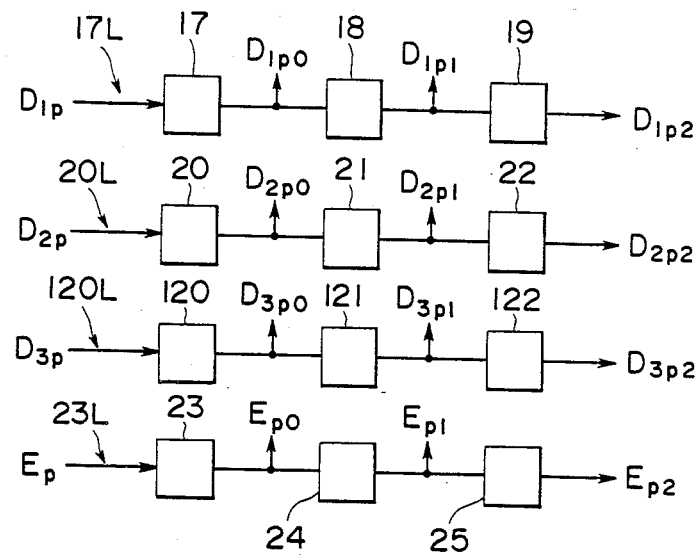
FIGS. 11, 12 and 13 are block diagrams showing a second embodiment according to this invention.
Figure 11:
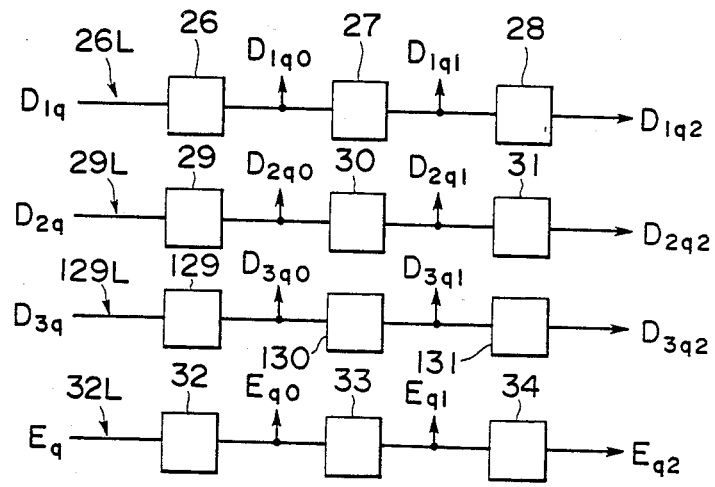
Figure 12:
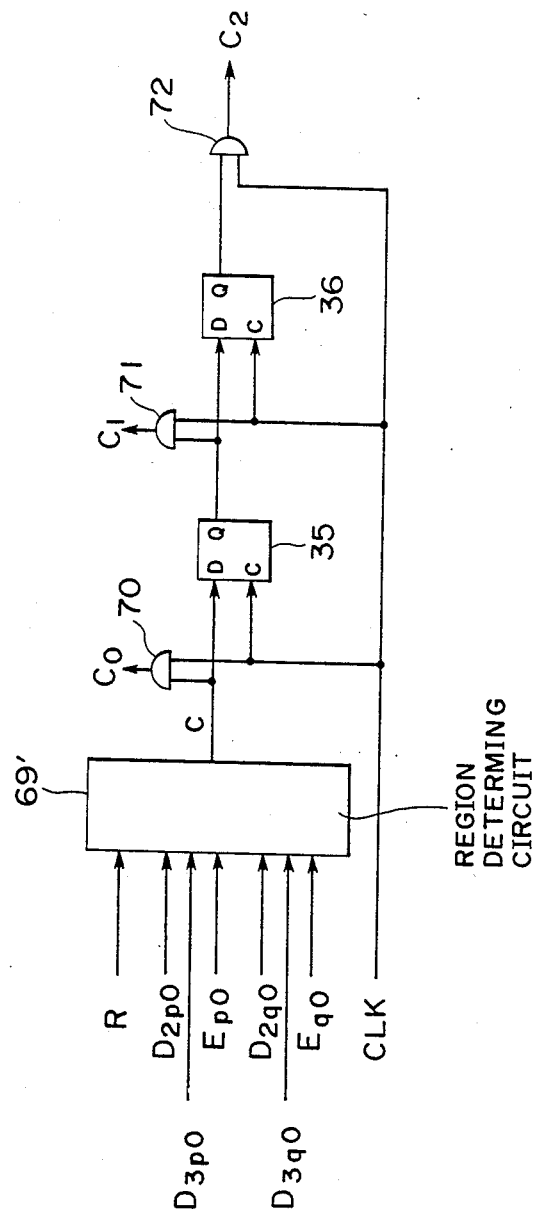
Figure 13:
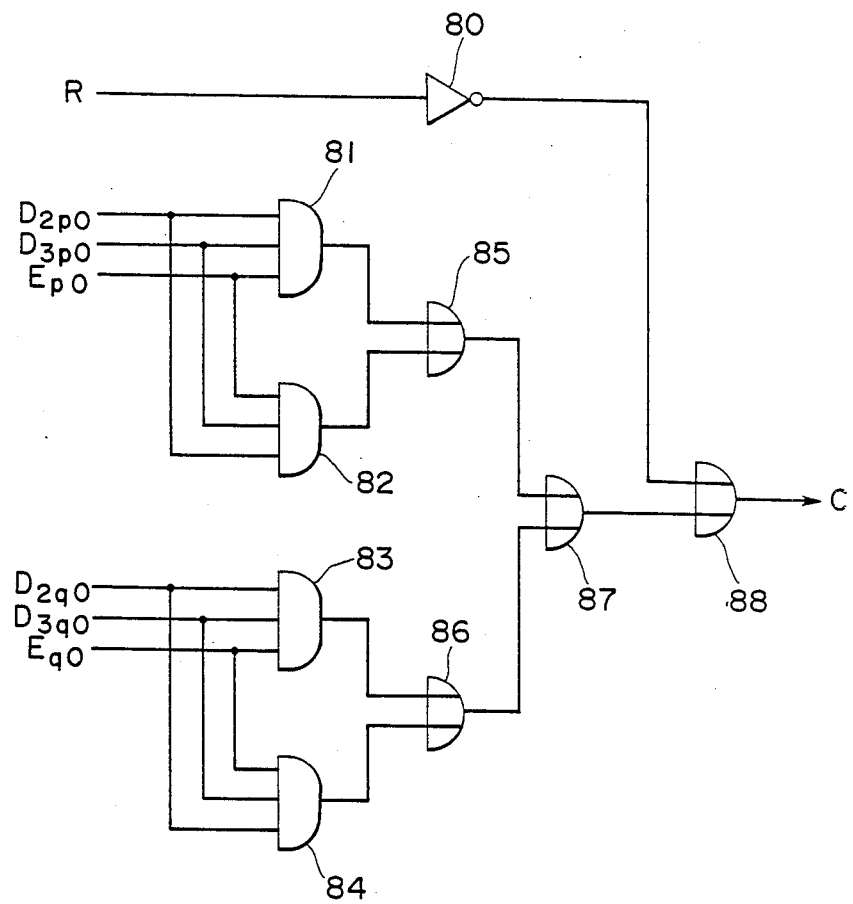
Figure 14:
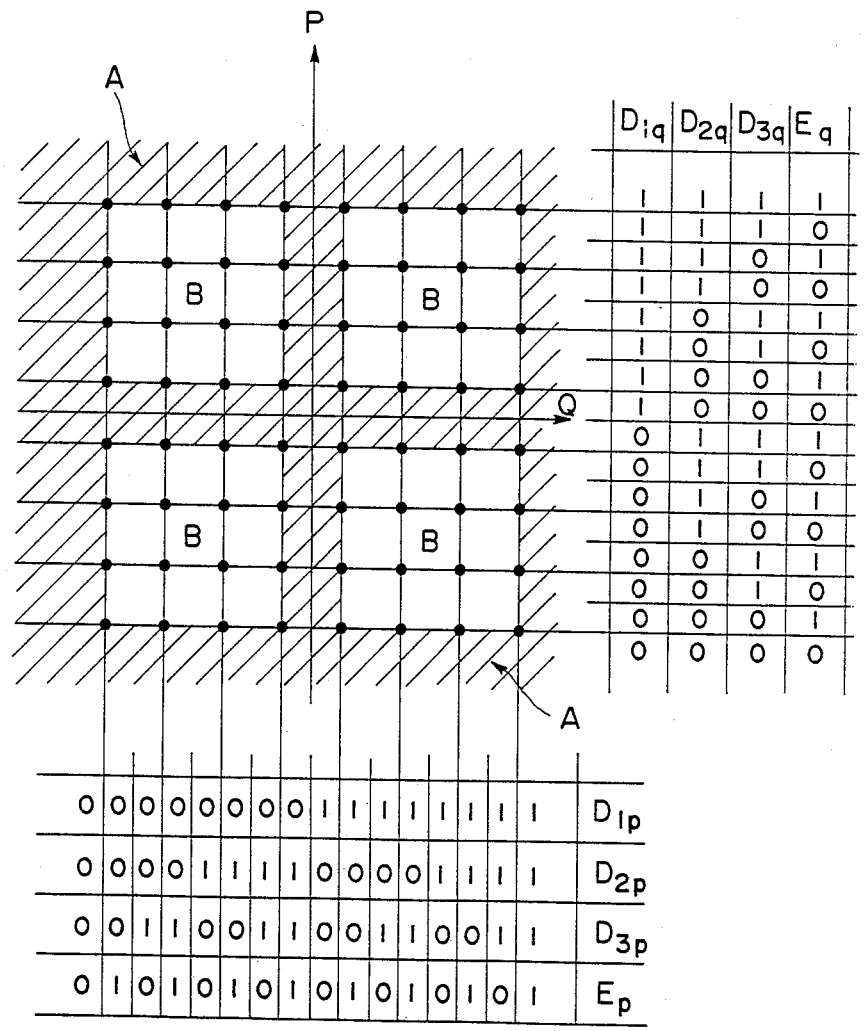
FIG. 14 is a signal space diagram of an incoming quadrature-modulated signal and also shows tables of the outputs of some of the blocks of the second embodiment.

The arrangement of FIG. 11 is identical to that of FIG. 6A except that the former arrangement further includes two delay means 120L and 129L adapted to receive data signals D3p and D3q, respectively. It is understood that the AD converters 14, 15 of FIG. 5 should be modified in a manner to output the data signals D3p and D3q. The arrangement of FIG. 12 is identical to that of FIG. 6B except that a region determining circuit 69′ of FIG. 12 is further supplied with the data signals D3p0 and D3q0. In FIG. 12, the outputs C0 and C2 are fed to the arrangement shown in FIG. 6C. FIG. 13 is a block diagram showing in detail the region determining circuit 69', which includes an invertor 80, four AND gates 81 to 84, four OR gates 85 to 88. FIG. 14 corresponds to FIG. 10, and it is understood that A and B regions of FIG. 14 are defined by the output C of FIG. 13. Operation of the second embodiment is essentially identical to that of the first embodiment, and hence further description of the second one will be omitted for clarity.

This invention demonstrates a remarkable effect when a message point deviates in an in-phase direction as above mentioned. However, even if a message point deviates in an orthogonal or phase direction, the demodulator according to this invention is brought into synchronism quicker than the known demodulators.

In the above, the transversal equalizer according to the present invention has been described as a type which is interposed in a IF stage. However, this invention is applicable to a transversal equalizer provided in a baseband stage with simple modifications.

Further, this invention can be applied to 256-QAM demodulator or even more higher multilevel type QAM demodulators.

The foregoing description shows only a selected number of embodiment of this invention. The various modifications possible without departing from the scope of this invention which is only limited by the appended claims will be apparent to those skilled in the art.

What is claimed is:

1. A QAM demodulator including a transversal equalizer and a demodulating section, said transversal equalizer including a transversal filter, said transversal filter compensating for intersymbol interference involved in an incoming quadrature-amplitude modulated signal applied thereto, said demodulating section receiving the output of said transversal filter and producing data and error signals, said demodulating section including a sine wave generator which produces a sine wave in response to asynchronism induced in said demodulating section, said demodulating section comprises:

first means coupled to said sine wave generator, said first means producing a first logic signal indicating whether or not said demodulator is in synchronism;

second means coupled to said sine wave generator, said second means producing a second logic signal according to the sine wave applied thereto, the period of said second logic signal being equal to the period of said sine wave, and the duty cycle of said second logic signal being adjustable, and said transversal equalizer comprising:

switch means having its output coupled to said transversal filter and having a first input coupled to said second means, said switch means intermittently applying a first constant voltage to said transversal filter in response to said second logic signal;

third means receiving the data and error signals and said first logic signal, and determining whether or not a message point of the incoming signal is deviated from the normal position thereof into a predetermined region of a signal space diagram, said third means outputting a third logic signal indicating whether or not the message point is deviated into said predetermined region; and fourth means coupled to a second input of said switch means, said fourth means responding to said first and third logic signals and controlling the operation of said transversal filter together with said switch means such that, (a) in the event that said demodulating section is in synchronism, said transversal equalizer is allowed to operate normally, (b) in the event that said demodulating section falls into asynchronism, if a deviated message point is detected within said predetermined region, said transversal filter intermittently operates and receives said first constant voltage between the intermittent operations, and (c) in the event that said demodulating section falls into asynchronism, if a deviated message point is outside said predetermined region, said transversal filter receives alternately said first constant voltage and a second constant voltage from said fourth means.

2. A QAM demodulator as claimed in claim 1, wherein said predetermined region is defined, within each quadrant of the signal space diagram, as a region surrounding the assembly of a plurality of normal message points.

* * * * *